S. SHETTER.
Hoe.
No. 17,848. Patented July 21, 1857.
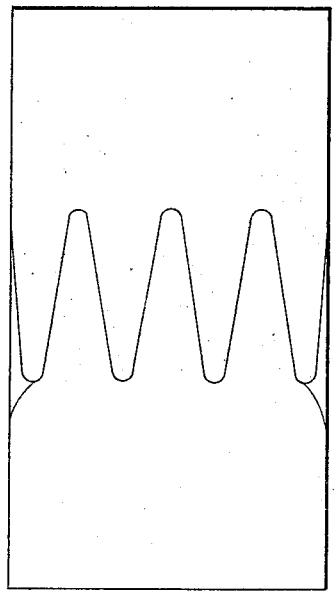
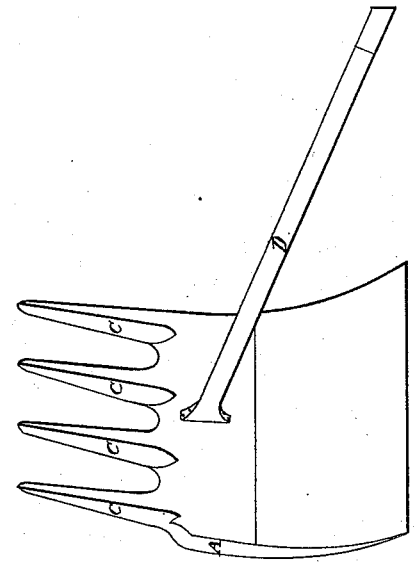
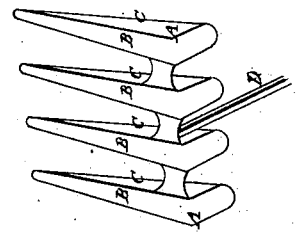
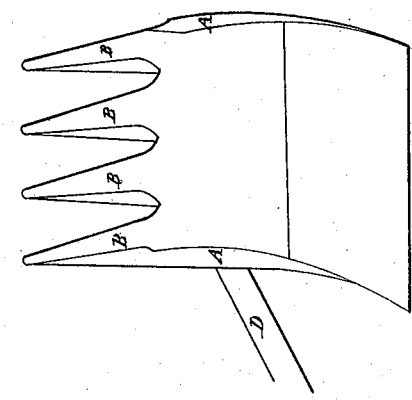

UNITED STATES PATENT OFFICE.

SOLOMON SHETTER, OF ALLEGHENY, PENNSYLVANIA.

IMPROVEMENT IN GARDEN-HOES.

Specification forming part of Letters Patent No. 17,848, dated July 21, 1857.

*To all whom it may concern:*

Be it known that I, SOLOMON SHETTER, of the city and county of Allegheny, and State of Pennsylvania, have invented a new and useful Improvement in Garden-Hoes; and I do hereby declare that the following is a full and exact description of the same, reference being had to the accompanying drawings, and to the letters of reference marked thereon.

The nature of my invention consists in cutting garden hoes or rakes and hoes combined out of sheet iron or steel, and turning up the side edges for the purpose of bracing and holding the blade in its desired form, and also in making the teeth of the rake on the hoe convexed on the face and concaved on the back for the purpose of giving strength to the teeth.

To enable others skilled in the art to make my invention, I will proceed to describe its construction in the accompanying drawings.

Figure 1 is a perspective view of the hoe and rake combined, looking at the face side. Fig. 2 is a perspective view, looking at the back of the hoe. Fig. 3 is a central section or cut view, showing the turned-up edges of the blade, and also showing the concavity and convexity of the teeth of the rake. Fig. 4 represents the mode of cutting the sheet iron or steel.

A is the turned-up edge.
B is the concave of teeth.
C is the convexed surface of the teeth.
D is the stem or tang for the handle of the hoe. It is secured to the blade by rivets, or it may be put on in any of the known ways.

The sheet iron or steel can be cut out by hand-labor. Edges A, the concavity B, and convexity C of the teeth can be done with hand-labor or by the use of suitable machinery.

By this improvement in constructing garden-hoes I save time, labor, and expense in making, and also make a strong, light, and durable hoe for garden use.

I do not claim the mere form of the tines or prongs on the top of the hoe-blade—that is to say, said tines being formed concave on the back and convex on the face; but What I do claim as my invention, and desire to secure by Letters Patent, is—

Cutting and forming hoe-blades out of sheet iron or steel, with side edges, A, and prongs C, as herein described, and for the purpose set forth.

SOLOMON SHETTER.

Attest:
JAMES J. JOHNSTON,
GEORGE P. STECK.